March 18, 1952     A. LERVIK     2,589,828
VALVE FACING APPARATUS
Filed Dec. 23, 1947
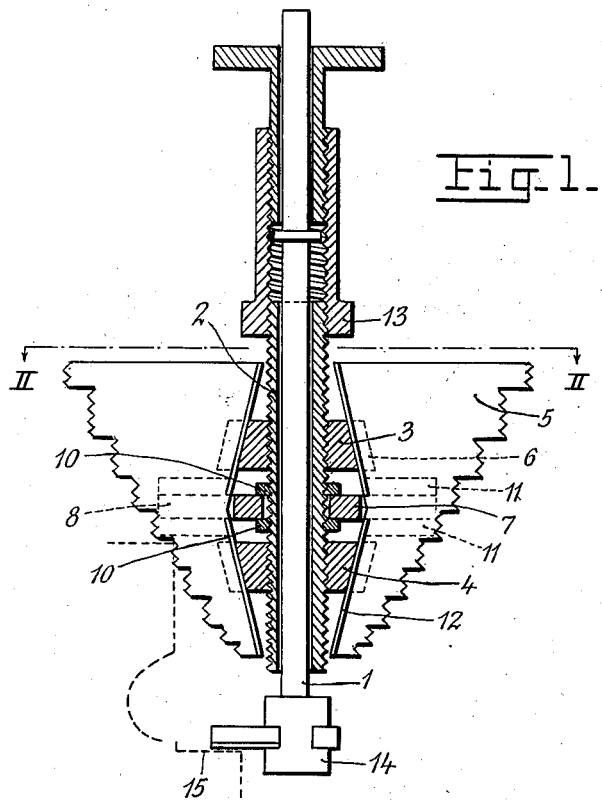
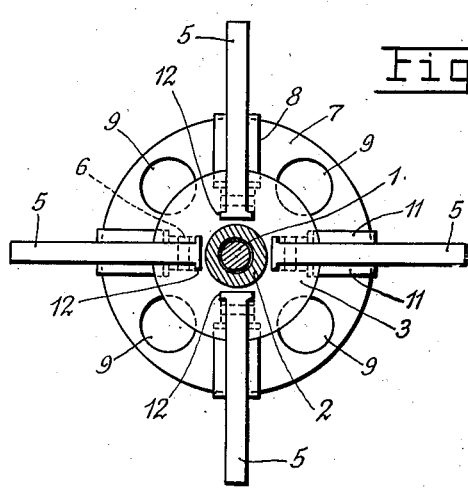
INVENTOR
ALF LERVIK Patented Mar. 18, 1952

2,589,828

UNITED STATES PATENT OFFICE 2,589,828

VALVE FACING APPARATUS

Alf Lervik, Oslo, Norway

Application December 23, 1947, Serial No. 793,355
In Norway October 6, 1939

Section 1, Public Law 690, August 8, 1946
Patent expires October 6, 1959

1 Claim. (Cl. 90—12.5)

The present invention relates to a valve facing apparatus of the kind which is adapted to be clamped fast on the inner wall of the valve casing, and in which a number of plate members symmetrically arranged around the facing spindle serve as centering jaws for the apparatus, the outer edges of the said members being stepped in such a way that the jaws by parallel displacement may be caused to seat against the top and wall of valve casings of different sizes.

The object of the invention is to provide a simple construction of such an apparatus whereby on the one hand is obtained that the apparatus may be used for a very large range of sizes of valve casings, and on the other hand that the centering jaws when being expanded are displaced in a parallel relationship in a known manner, so that a correct centering and the best possible gripping action of the jaws are ensured at any time.

With this object in view and according to the invention the inner edge of the said plate members are shaped as two faces inclined at an obtuse angle to each other, the apex of which angle which is located approximately centrally between the upper and lower edges of the plate members being directed away from the axis of the facing spindle, the said faces being seated respectively against two cone- or wedgeshaped members, which are axially displaceable in opposite direction relative to the jaws and serve for the expansion of the latter.

An embodiment of the apparatus according to the invention is described in the following with reference to the drawing, in which Fig. 1 is an axial section through the apparatus according to the invention, and Fig. 2 is a plan view of the same of the line II—II in Fig. 1.

The tool is used to resurface valve seats provided with a centering device to accurately hold the tool in proper position during the facing or resurfacing operation.

In the drawing 1 designates a facing spindle is surrounded by a socket or sleeve 2, which on one half is right-threaded and on the other half left-threaded. On the socket is threaded two nuts or expansion members respectively 3 and 4 with inclined or conical side faces. The centering jaws are formed as four plates 5 arranged symmetrically around the socket 2, the outer edges of which, as shown, are stepped in such a manner that the jaws may be caused to seat against the top and wall of valve casings of different sizes. The inner edges of the plates are inclined from the center and towards both sides at an angle corresponding to the inclined faces of the nuts or expansion members 3 and 4. The nuts are provided with radial slots 6, into which the plates 5 enter and which serve to guide the plates. Additionally for guiding the plates 5 a disc 7 is provided which is provided with radial slots 8 corresponding to the plates 5. This disc is besides provided with holes 9 to permit the worker of seeing the operation of the facing tool. On both sides of the disc 7 nuts 10 are screwed on the socket 2 and secured in locked position by set screws in order to prevent the socket from being displaced in the longitudinal direction.

Guiding bars 11 are welded or in some other way secured to the plates 5, the disc 7 entering into the slots provided by the bars 11. The inner edges of the plates 5 have flanges 12 and 12', the slots in the nuts or expansion members 3 and 4 having a corresponding shape.

The inner edge of the plate 5 thus together with the flanges 12 and 12' constitute two faces inclined at an obtuse angle to each other, the apex of which, which is located approximately centrally between the upper and lower edge of the plate members being directed away from the axis of the facing spindle, the said faces being seated respectively against two cone- or wedge-shaped members 3 or 4 which are axially displaceable relatively to the jaws for expanding the latter.

The vertical portions of the steps on the plates 5 are suitably provided with thread-like teeth in order to be able to grip well, and in order to, when the apparatus is clamped fast on threads, not to spoil the latter.

When the apparatus is to be used, the plates 5 are placed on the valve casing with the step which is best suited. By turning a sleeve 13, which is fast on the socket 2, the socket is turned, whereby the nuts 3, 4 are displaced, the one upwards, the other one downwards, so that the plates 5 are forced outwards and clamped fast.

In the drawing the facing head is indicated at 14 and the valve casing at 15.

Thus according to the invention a universal tool is obtained, which may be used on practically all sizes and types of valves. The apparatus may be clamped fast in a simple and easy manner and is automatically centered.

I claim:

A valve facing apparatus comprising a spindle having a facing tool at one end thereof, a sleeve rotatably mounted on the spindle and having right and left hand thread sections on the peripheral surface thereof, a plurality of plates mounted around the sleeve in spaced radial relationship and each having a pair of cam surfaces on the inner side surface thereof and a series of stepped sections on the outer side surface, the cam surfaces being shaped as two faces inclined at an obtuse angle relative to each other, a pair of members each having a cam surface engaging one of the respective pairs of cam surfaces of the plates and an internal threaded surface engaging one of the sections of threads on the sleeve, and means for rotating the sleeve to adjust the members toward or away from each other to move the plates radially by the cam surfaces for adjustment in the valve to be worked.

ALF LERVIK.

REFERENCES CITED

The following references are of record in the file of this patent:

UNITED STATES PATENTS

| Number | Name | Date |
|---|---|---|
| 513,392 | Hall | Jan. 23, 1894 |
| 605,810 | Purdy | June 14, 1898 |
| 1,361,134 | Branning | Dec. 7, 1920 |
| 1,597,499 | Albee | Aug. 24, 1926 |
| 1,701,329 | McIntosh | Feb. 5, 1929 |
| 1,796,208 | Mahoney | Mar. 10, 1931 |
| 2,302,858 | Hare | Nov. 24, 1942 |

FOREIGN PATENTS

| Number | Country | Date |
|---|---|---|
| 10,336 | Great Britain | Dec. 18, 1913 |
| 17,000 | Great Britain | of 1900 |